(12) United States Patent
Thompson et al.

(10) Patent No.: US 10,962,688 B2
(45) Date of Patent: Mar. 30, 2021

(54) LOW TG POLYURETHANE PROTECTIVE DISPLAY FILM

(71) Applicant: 3M INNOVATIVE PROPERTIES COMPANY, St. Paul, MN (US)

(72) Inventors: David S. Thompson, Bayport, MN (US); Ryan M. Braun, St. Paul, MN (US); Joseph D. Rule, Woodbury, MN (US); Catherine A. Leatherdale, Woodbury, MN (US); Steven D. Solomonson, Shoreview, MN (US); Peter D. Condo, Lake Elmo, MN (US); John J. Stradinger, Roseville, MN (US); Michael A. Johnson, Stillwater, MN (US); Richard J. Pokorny, Maplewood, MN (US); Derek W. Patzman, Savage, MN (US); Peihui Zhang, Woodbury, MN (US); Evan L. Breedlove, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 223 days.

(21) Appl. No.: 16/311,863

(22) PCT Filed: Jun. 29, 2017

(86) PCT No.: PCT/US2017/040058
§ 371 (c)(1),
(2) Date: Dec. 20, 2018

(87) PCT Pub. No.: WO2018/005833
PCT Pub. Date: Jan. 4, 2018

(65) Prior Publication Data
US 2020/0309999 A1    Oct. 1, 2020

Related U.S. Application Data

(60) Provisional application No. 62/357,423, filed on Jul. 1, 2016.

(51) Int. Cl.
*G02B 5/20* (2006.01)
*G02B 1/14* (2015.01)
(Continued)

(52) U.S. Cl.
CPC ............ *G02B 1/14* (2015.01); *B32B 27/16* (2013.01); *C08J 7/042* (2013.01)

(58) Field of Classification Search
CPC ... G02B 1/14; G02B 1/00; G02B 1/04; G02B 1/10; G02B 1/18; G02F 1/133305;
(Continued)

(56) References Cited

U.S. PATENT DOCUMENTS

| 4,921,759 A | 5/1990 | Orain |
| 6,376,082 B1 | 4/2002 | Edmond |

(Continued)

FOREIGN PATENT DOCUMENTS

| CN | 1602251 | 3/2005 |
| JP | 2012 091406 | 5/2012 |

(Continued)

OTHER PUBLICATIONS

Miller, "A New Derivation of Post Gel Properties of Network Polymers", Macromolecules, Mar.-Apr. 1976, vol. 9, No. 2, pp. 206-211.

(Continued)

*Primary Examiner* — Arnel C Lavarias
(74) *Attorney, Agent, or Firm* — Lisa P. Fulton

(57) ABSTRACT

A display film includes a transparent cross-linked polyurethane layer. The transparent cross-linked polyurethane layer having a glass transition temperature of 10 degrees Celsius or less and a Tan Delta peak value of 0.5 or greater.

35 Claims, 3 Drawing Sheets

(51) Int. Cl.
*B32B 27/16* (2006.01)
*C08J 7/04* (2020.01)

(58) Field of Classification Search
CPC ....... G02F 1/1335; G02F 2001/133311; G02F 2001/1536; G02F 2201/50; G02F 2201/501; B32B 27/16; B32B 27/40; C08J 7/042; C08J 7/0427; C08J 2475/04; C08J 2375/04
USPC .............. 359/359, 350, 483.01, 489.01, 507; 349/56, 84, 96, 122, 158
See application file for complete search history.

(56) References Cited

U.S. PATENT DOCUMENTS

| | | | |
|---|---|---|---|
| 6,376,590 | B2 | 4/2002 | Kolb |
| 7,178,264 | B2 | 2/2007 | Kim |
| 7,241,437 | B2 | 7/2007 | Davidson |
| 7,980,910 | B2 | 7/2011 | Padiyath |
| 10,005,264 | B2 | 6/2018 | Leatherdale |
| 10,208,178 | B2 * | 2/2019 | Gelfer ..................... F16L 59/14 |
| 2006/0148950 | A1 | 7/2006 | Davidson |
| 2008/0020170 | A1 | 1/2008 | Haubrich |
| 2009/0280329 | A1 | 11/2009 | Rukavina |
| 2011/0045288 | A1 | 2/2011 | Koda |
| 2011/0045306 | A1 | 2/2011 | Johnson |
| 2012/0229893 | A1 | 9/2012 | Hebrink |
| 2013/0129977 | A1 | 5/2013 | Takihara |
| 2013/0251961 | A1 | 9/2013 | Johnson |
| 2014/0092360 | A1 | 4/2014 | Zheng |
| 2015/0044456 | A1 | 2/2015 | Chien |
| 2015/0330597 | A2 | 11/2015 | Schaffer |
| 2017/0081488 | A1 | 3/2017 | Eveson |
| 2018/0264790 | A1 * | 9/2018 | Leatherdale ........ H01L 51/5253 |
| 2019/0211168 | A1 * | 7/2019 | Thompson ........... C08G 18/672 |
| 2020/0001577 | A1 * | 1/2020 | Woody, V ............. B32B 27/281 |
| 2020/0028117 | A1 * | 1/2020 | Eckert ...................... B32B 7/12 |

FOREIGN PATENT DOCUMENTS

| | | |
|---|---|---|
| WO | WO 2003-094256 | 11/2003 |
| WO | WO 2006-102383 | 9/2006 |
| WO | WO 2009-029438 | 3/2009 |
| WO | WO 2009-120548 | 10/2009 |
| WO | WO 2011-056396 | 5/2011 |
| WO | WO 2014-011731 | 1/2014 |
| WO | WO 2014-092422 | 6/2014 |
| WO | WO 2014-197194 | 12/2014 |
| WO | WO 2014-197368 | 12/2014 |
| WO | WO 2016-196460 | 12/2016 |
| WO | WO 2017-105850 | 6/2017 |
| WO | WO 2017-214105 | 12/2017 |

OTHER PUBLICATIONS

Ni, "A Review on Colorless and Optically Transparent Polyimide Films: Chemistry, Process and Engineering Applications", Journal of Industrial and Engineering Chemistry, 2015, vol. 28, pp. 16-27.
International Search Report for PCT International Application No. PCT/US2017/040058, dated Jan. 9, 2018, 3pgs.

* cited by examiner

LOW TG POLYURETHANE PROTECTIVE DISPLAY FILM

BACKGROUND

Displays and electronic devices have evolved to be curved, bent, or folded and provide new user experiences. These device architectures may include flexible organic light emitting diodes (OLEDs), plastic liquid crystal displays (LCDs) and the like, for example.

In order to realize such flexible displays and protect elements in the displays, a flexible cover sheet or flexible window film replaces a conventional glass cover sheet. This flexible cover sheet has a number of design parameters such as; high visible light transmission, low haze, excellent scratch resistance and puncture resistance, in order to protect the elements included in the display devices. In some cases the flexible cover sheet may also need to withstand thousands of folding events around a tight bend radius (about 5 mm or less) without showing visible damage. In other cases, the flexible cover sheet must be able to unfold without leaving a crease after being bent at elevated temperature and humidity.

A variety of hard coated plastic substrates have been explored. More exotic materials like hard coated colorless transparent polyimide films have also been shown to have high hardness and good scratch resistance. However many hard coated films fail to withstand folding events around a tight bend radius without showing visible damage.

SUMMARY

The present disclosure relates to display film that protects a display window and may survive flexing or folding tests. The protective display film maintains optical properties of a display film while providing scratch resistance to the display. The display film includes a transparent polyurethane layer having a low glass transition temperature.

In one aspect, a display film includes a transparent cross-linked polyurethane layer. The transparent cross-linked polyurethane layer having a glass transition temperature of 10 degrees Celsius or less and a Tan Delta peak value of 0.5 or greater.

In another aspect, a display film includes a transparent polymeric substrate layer, and a transparent cross-linked polyurethane layer disposed on the transparent polymeric substrate layer. The transparent cross-linked polyurethane layer has a glass transition temperature of 10 degrees Celsius or less and a Tan Delta peak value of 0.5 or greater.

In another aspect, a display film includes a transparent cross-linked polyurethane layer, and a transparent protective layer disposed on the transparent cross-linked polyurethane layer. The transparent cross-linked polyurethane layer having a glass transition temperature of 10 degrees Celsius or less and a Tan Delta peak value of 0.5 or greater. The transparent protective layer may be a hardcoat layer, an abrasion resistant layer or an elastic nano-composite layer.

In another aspect, an article includes an optical display, a display film described herein, and an optical adhesive layer fixing the display film to the optical display.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
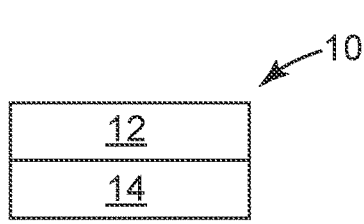
FIG. 1 is a schematic diagram side elevation view of an illustrative display film.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The terms "display film", "protective film", "cover sheet film", and "protective display film" are herein used interchangeably.

"Transparent substrate" or "transparent layer" refers to a substrate or layer that has a high light transmission (typically greater than 90%) over at least a portion of the surface of the substrate over at least a portion of the light spectrum with wavelengths of about 350 to about 1600 nanometers, including the visible light spectrum (wavelengths of about 380 to about 750 nanometers).

"Polyurethane" refers to polymers prepared by the step-growth polymerization of hydroxyl-functional materials (materials containing hydroxyl groups —OH) with isocyanate-functional materials (materials containing isocyanate groups —NCO) and therefore contain urethane linkages (—O(CO)—NH—), where (CO) refers to a carbonyl group (C=O). The term may include "polyurethane-ureas" in which both urethane linkages and urea linkages are present.

The phrase "glass transition temperature" refers herein to the "on-set" glass transition temperature by DSC and is measured according to ASTM E1256-08 2014.

The phrase "Tan Delta peak value" and peak temperature is measured according to the DMA analysis described in the Examples.

The present disclosure relates to display film that protects a display or display window and may survive flexing or folding tests. The protective display film maintains optical properties of a display film while providing scratch resistance or abrasion resistance to the display. The protective display film includes a core layer of a cross-linked polyurethane material that is transparent and has a glass transition temperature of less than 10 degrees Celsius or less than 5 degrees Celsius. The protective display film may protect flexible optical displays even under conditions of dynamic folding at low temperatures. The cross-linked polyurethane has a low glass transition temperature, such as 5 degrees Celsius less, or zero degrees Celsius or less, or −5 degrees Celsius or less, or −10 degrees Celsius or less or in a range from −40 to 5 degrees Celsius, or in a range from −30 to 5 degrees Celsius, or in a range from −20 to 5 degrees Celsius, or in a range from −15 to 5 degrees Celsius. The cross-linked polyurethane has a Tan Delta peak value of 0.5 or greater, or 0.8 or greater, or 1.0 or greater, or 1.2 or greater. The protective display film can include a layered structure including a layer of the cross-linked polyurethane material and hardcoat layer or hardcoated substrate layer disposed on the cross-linked polyurethane layer, for example. These protective display film may withstand a bend radius of 5 mm or less, or 4 mm or less, or 3 mm or less, or 2 mm or less, or even 1 mm or less without failure or visible defects, such as delamination, cracking, or haze. While the present disclosure is not so limited, an appreciation of various aspects of the disclosure will be gained through a discussion of the examples provided below.

FIG. 1 is a schematic diagram side elevation view of an illustrative display film 10. The terms "display film", "cover film", "protective film", "protective cover film" or "protective display film" are used interchangeable herein. The display film 10 includes a transparent polymeric substrate layer 12 and a transparent cross-linked polyurethane layer 14 disposed on the transparent polymeric substrate layer 12. The transparent cross-linked polyurethane layer 14 has a glass transition temperature of 10 degrees Celsius or less and a Tan Delta peak value of 0.5 or greater.

Figure 2:
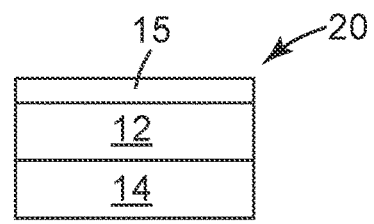
FIG. 2 is a schematic diagram side elevation view of another illustrative display film.

FIG. 2 is a schematic diagram side elevation view of an illustrative display film 20 that includes a hardcoat layer 15. The hardcoat layer 15 is disposed on the transparent polymeric substrate layer 12, and the transparent polymeric substrate layer 12 separates the transparent cross-linked polyurethane layer 14 from the hardcoat layer 15.

Figure 3:
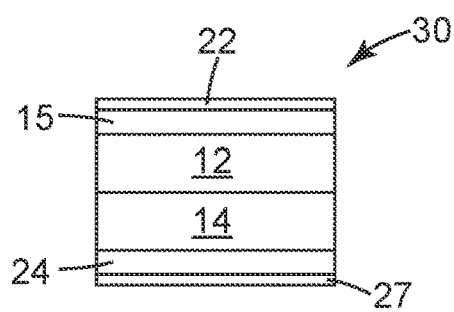
FIG. 3 is a schematic diagram side elevation view of another illustrative display film.

FIG. 3 is a schematic diagram side elevation view of an illustrative display film 30 that includes the construction of FIG. 2 with an optional adhesive layer 24 and release liners 22, 27 defining the outer surfaces of the illustrative display film 30. The adhesive layer 24 is disposed on the transparent cross-linked polyurethane layer 14. The transparent cross-linked polyurethane layer 14 separates the transparent polymeric substrate layer 12 from the adhesive layer 24.

The adhesive layer 24 may be an optical adhesive. The adhesive layer 24 may be a pressure sensitive adhesive. The adhesive layer 24 may be included in any of the display film constructions described herein. One or both of the release liners 22, 27 may be included in any of the display film constructions described herein. The release liners may also be referred to as "premask" layers that may be easily removed for application to an optical display or to reveal the display film, before or after placement onto an optical display. The optical adhesive layer may include acrylate, silicone, polyolefin, polyester, polyurethane or polyisobutylene based optical adhesives.

The removable liners (or premask layers) 22, 27 may provide transport protection to the underlying display film 12, 14, 15 and optional optical adhesive layer 24. The removable liners 22, 27 may be layer or film that has a low surface energy to allow clean removal of the liner 22, 27 from the display film 10 and optional optical adhesive layer 24. The removable liners 22, 27 may be a layer of polyester coated with a silicone, for example.

The removable liner 27 may provide temporary structure to the optional optical adhesive layer 24. For example, WO2014/197194 and WO2014/197368 describe removable liners that emboss an optical adhesive layer where the optical adhesive losses its structures once the removable liner is stripped away from the optical adhesive layer.

Figure 4:
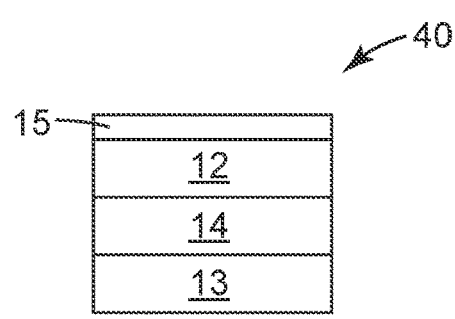
FIG. 4 is a schematic diagram side elevation view of another illustrative display film.

FIG. 4 is a schematic diagram side elevation view of another illustrative display film 40 that includes the construction of FIG. 2 with a second transparent substrate layer 13. The second transparent polymeric substrate layer 13 is disposed on the transparent cross-linked polyurethane layer 14. The transparent cross-linked polyurethane layer 14 separates the transparent polymeric substrate layer 12 from the second transparent polymeric substrate layer 13.

Figure 5:
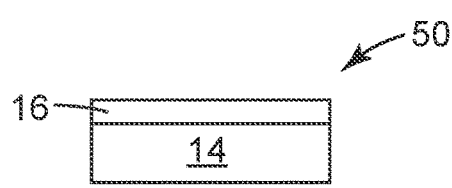
FIG. 5 is a schematic diagram side elevation view of another illustrative display film.

FIG. 5 is a schematic diagram side elevation view of another illustrative display film 50. A transparent protective layer 16 is disposed on a transparent cross-linked polyurethane layer 14. The transparent cross-linked polyurethane layer 14 has a glass transition temperature of 10 degrees Celsius or less and a Tan Delta peak value of 0.5 or greater. The protective layer 16 may be a hardcoat layer, or an abrasion resistant layer, or an elastic nano-composite layer.

Figure 6:
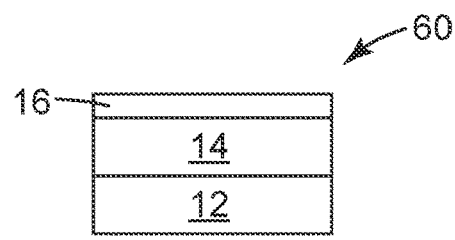
FIG. 6 is a schematic diagram side elevation view of another illustrative display film.

FIG. 6 is a schematic diagram side elevation view of another illustrative display film 60 that includes the construction of FIG. 5 with a transparent substrate layer 12 disposed on the transparent cross-linked polyurethane layer 14. The transparent cross-linked polyurethane layer 14 separates the transparent substrate layer 12 from the transparent protective layer 16.

The illustrative display film constructions may include an ink border that defines a viewing window. The ink border may be a continuous frame element printed, for example, onto the transparent cross-linked polyurethane layer or the substrate layer, for example.

Figure 7:
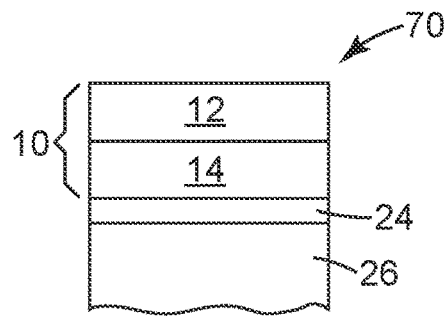
FIG. 7 is a schematic diagram side elevation view of an illustrative display film on an optical display forming an article.

FIG. 7 is a schematic diagram side elevation view of an illustrative display film 10 on an optical element 26 forming an article 70. The display film 10 may be any of the of display film constructions described herein. An adhesive layer 24 (such as an optical adhesive) adheres the display film 10 to the optical element 26. In some cases the optical adhesive permanently fixes the display film to the optical element 26. In other cases the display film and optical adhesive can be removed/debonded/repositioned, relative to the optical element 26, with the application of heat or mechanical force such that the display film is replaceable or repositionable by the consumer.

Further examples of optical displays include static display such as commercial graphic signs and billboards.

Figure 8:
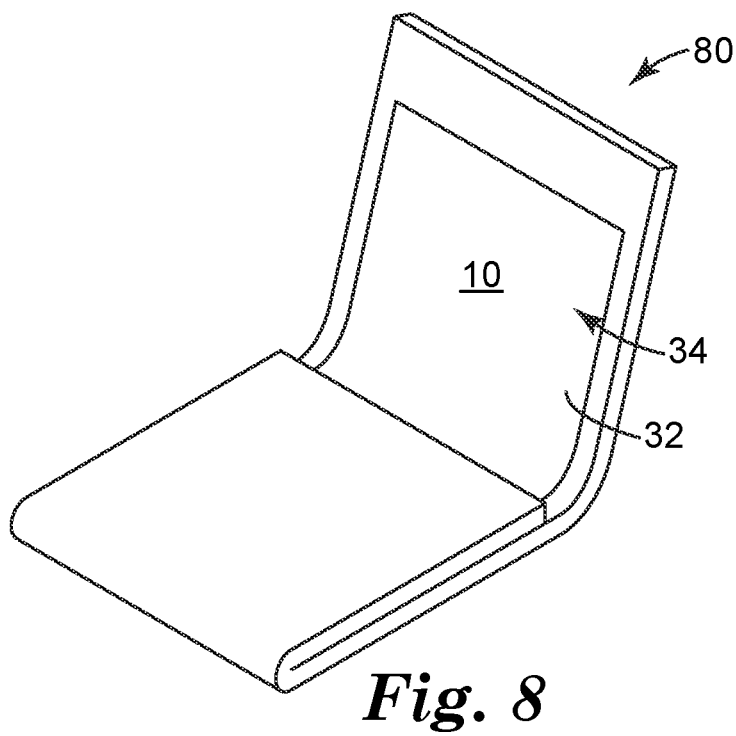
FIG. 8 is a schematic diagram perspective view of an illustrative folding article including an illustrative display film.

FIG. 8 is a schematic diagram perspective view of an illustrative folding display device 80 including an illustrative display film 10. The display film 10 may be any of the display film constructions described herein disposed on an optical element such as an optical display 34. The display device may not be a folding article and may only flex within a certain range, or may be a static curved display device.

An optical display 34 may form at least a portion of display device. The display device 80 may include a display window 32. The display device 80 can be any useful article such as a phone or smartphone, electronic tablet, electronic notebook, computer, and the like. The optical display may include an organic light emitting diode (OLED) display panel. The optical display may include a liquid crystal display (LCD) panel or a reflective display. Examples of reflective displays include electrophoretic displays, electrofluidic displays (such as an electrowetting display), interferometric displays or electronic paper display panels, and are described in US 2015/0330597.

The display film 10 and the optical display 34 may be foldable so that the optical display 34 faces itself and at least a portion of display film 10 contacts or directly faces another portion of the protective film 10, as illustrated in FIG. 8. The display film 10 and the optical display 34 may be flexible or bendable or foldable so that a portion of the display film 10 and the optical display 34 can articulate relative to another portion of the display film 10 and the optical display 34. The display film 10 and the optical display 34 may be flexible or bendable or foldable so that a portion of the display film 10 and the optical display 34 can articulate at least 90 degrees or at least 170 degrees relative to another portion of the display film 10 and the optical display 34.

The display film 10 and the optical display 34 may be flexible or bendable or foldable so that a portion of the display film 10 and the optical display 34 can articulate relative to another portion of the display film 10 and optical display 34 to form a bend radius of 3 mm or less in the display film 10 at the bend or fold line. The display film 10 and the optical display 34 may be flexible or bendable or foldable so that a portion of the display film 10 and optical display 34 can articulate relative to another portion of the display film 10 and the optical display 34 to form a bend radius such that the display film 10 overlaps itself and is separated from each other by a distance on 10 mm or less, or 6 mm or less or 3 mm or less or contacts each other.

The protective cover films described herein may be constructed in a number of ways, but include a core inner layer (cross-linked polyurethane layer) that provides beneficial properties in impact while not leading to failure in dynamic folding events, even at low temperatures (such as less than 10 degrees Celsius, or less than 0 degrees Celsius, or less than −10 degrees Celsius, or less than −20 degrees Celsius).

The transparent cross-linked polyurethane layer (or core layer) may be designed to have beneficial properties with respect to impact resistance and the ability to survive dynamic folding at low temperature conditions. The core layer preferably includes chemically or covalently cross-linked materials derived from step growth polymerization of isocyanate and polyol oligomers. Selection of reactant isocyanates and polyols may modify the glass transition temperature of the resulting cured polyurethane.

The cross-linked polyurethane layer may be coated onto the transparent polymeric substrate layer (that may be primed) and then be cured or cross-linked to form a thermoset polyurethane layer. Polyurethane is a polymer composed of organic units joined by carbamate (urethane) links. The polyurethanes described herein are thermosetting polymers that do not melt when heated. Polyurethane polymers may be formed by reacting a di- or polyisocyanate with a polyol. Both the isocyanates and polyols used to make polyurethanes contain on average two or more functional groups per molecule. The polyurethanes described herein may be derived from components that have functionality greater than 2.4 or 2.5.

For the purposes of processing, the isocyanate and polyol components can be mixed just prior to application of the material to the substrate used for making the cover film. Generally the average functionality of the isocyantes used to make the core layer is less than 3.5 (i.e. an average of 3.5 isocyanate functional groups per molecule) or 3 or less. The ideal cured material exhibits stable material properties with respect to the cover film use in application, i.e. the core inner layer does not exhibit appreciable flow but is stable enough to provide durability in physical testing in folding devices, for example low temperature dynamic folding performance.

The glass transition temperature of the core layer is less than 10° C., or less than 5° C., or less than 0° C., or even less than −5° C. In some cases, it is also desirable that the crosslinked core material have a high peak tan delta value (>0.5, >0.8, >1.0 or greater than 1.2). In some cases, the core layer may also contain inorganic nanoparticles, either functional that are chemically reacted to the matrix or nonfunctional that are not reacted to the core layer matrix resin. The incorporation of nanoparticles may provide beneficial properties related to impact resistance and energy dissipation from impact events."

A wide variety of polyisocyanates may be used to from the cross-linked polyurethane layer. The term polyisocyanate includes isocyanate-functional materials that generally include at least 2 terminal isocyanate groups. Polyisocyanates include diisocyanates (materials with 2 terminal isocyanate groups) and higher polyisocyanates such as triisocyanates (materials with 3 terminal isocyanate groups), tetraisocyanates (materials with 4 terminal isocyanate groups), and the like. Typically the reaction mixture contains at least one higher isocyanate if a difunctional polyol is used. Higher isocyanates are particularly useful for forming crosslinked polyurethane polymers. Diisocyanates may be generally described by the structure OCN—Z—NCO, where the Z group may be an aliphatic group, an aromatic group, or a group containing a combination of aromatic and aliphatic groups. In some embodiments, it is preferable to use an aliphatic isocyanate, such as isophorone diisocyanate (IPDI), dicyclohexylmethane-4,4'-diisocyanate (H12MDI), dimeryl diisocyanate (DDI), pentamethylenediisocyanate (PDI), hexamethylenedisocyanate (HDI), and oligomers, derivatives, or combinations of these isocyanates.

Higher functional polyisocyanates are particularly useful, such as triisocyanates, to form a crosslinked polyurethane polymer layer. Triisocyanates include, but are not limited to, polyfunctional isocyanates, such as those produced from isocyanurates, biurets, allophanates, uretdiones, iminooxadiazinediones, carbodiimides, uretoneimines adducts, and the like. Some commercially available polyisocyanates include portions of the DESMODUR and MONDUR series from Bayer Corporation, Pittsburgh, Pa., and the PAPI series from Dow Plastics, a business group of the Dow Chemical Company, Midland, Mich.

In some embodiments, isocyanates based on HDI are preferred to provide a glass transition temperature below 10° C. Monomeric HDI can be used, but in some embodiments, it is preferred to use oligomers of HDI. Oligomeric HDI can reduce the vapor pressure of the isocyanate to allow safer handling and may provide functionalities greater than 2.0 to provide chemical crosslinking of the core layer material. The HDI oligomers can contain functional groups including isocyanurates, biurets, allophanates, uretdiones, iminooxadiazinediones, carbodiimides, or uretoneimines. In some embodiments, prepolymers derived from HDI and polyols can be used. In some embodiments, it is preferred to use HDI oligomers containing uretdione functionality and isocyanurate functionality. Particularly useful higher isocyanates include those available from Bayer Corporation under the trade designations DESMODUR N3300A, Desmodur N3400, and MONDUR 489. An oligomer containing both uretdione and isocyanurate groups can be obtained under the trade name DESMODUR N3400, and an oligomer containing isocyanurate groups can be obtained under the tradename DESMODUR N3300. One particularly suitable aliphatic polyisocyanate is DESMODUR N3300A.

A wide variety of polyols may be used to form the cross-linked polyurethane layer. The term polyol includes hydroxyl-functional materials that generally include at least 2 terminal hydroxyl groups. Polyols include diols (materials with 2 terminal hydroxyl groups) and higher polyols such as triols (materials with 3 terminal hydroxyl groups), tetraols (materials with 4 terminal hydroxyl groups), and the like. Typically the reaction mixture contains at least some diol and may also contain higher polyols. Higher polyols are particularly useful for forming crosslinked polyurethane polymers. Diols may be generally described by the structure HO—B—OH, where the B group may be an aliphatic group, an aromatic group, or a group containing a combination of aromatic and aliphatic groups, and may contain a variety of linkages or functional groups, including additional terminal hydroxyl groups.

In some embodiments, the polyol is an oligomeric polyether such as polyethylene glycol, polypropylene glycol, or polytetramethylene ether glycol. In some embodiments, aliphatic polyester polyols are particularly useful. Useful polyester polyols are linear and non-linear polyester polyols including, for example, polyethylene adipate, polypropylene adipate, polybutylene adipate, polyhexamethylene adipate, polyneopentyl adipate, polycyclohexanedimethyl adipate, polydiethylene glycol adipate, polybutylene succinate, polyhexamethylene sebacate, polyhexamethylene dodecanedioate, and poly ε-caprolactone and copolymers of these polyesters. Particularly useful are aliphatic polyester polyols available from King Industries, Norwalk, Conn., under the trade name "K-FLEX" such as K-FLEX 188 or K-FLEX A308. In some embodiments, the polyester polyol can include polyesters derived from cyclohexanedimethanol and aliphatic diacids. In some embodiments, it is preferred to use polyester polyols that are liquids at room temperature to facilitate mixing and coating at ambient temperature. In some embodiments, it is preferred to use polyester polyols that produce a sharp tan delta signal in DMA testing, such as polyesters based on cyclohexanedimethanol and neopentyl glycol.

The core layer may be derived from an oligomeric polyol. In some embodiments, the polyol component may include a chain extender with a molecular weight of less than 200 g/mol. In some embodiments, the polyol component comprises only oligomeric polyol and is substantially free of chain extenders.

To produce a core layer with a glass transition temperature below 10° C., it can be preferable to limit the amount of the isocyanate component. In some embodiments using HDI-derived isocyanates, it can be preferable to use less than 40 wt % isocyanate component based on the total core layer composition, or less than 38 wt %, or less than 35 wt %. In some embodiments, it is preferable to use an isocyanate component containing uretdione groups. When uretdione groups are included, it can be preferable to use an excess of hydroxyl functional groups relative to isocyanate groups. The excess hydroxyl groups can react with the uretdione groups to form allophanate groups to provide cure and chemical crosslinking. In some embodiments, it is preferable to include only a single polyol component to produce a narrow tan delta peak. In some embodiments, it is preferable to use a polyol component and an isocyanate component that are miscible with each other at room temperature.

The cross-linked polyurethane layer is preferably prepared such that the combined average functionality of the polyol component and the isocyanate component is greater than 2.4 or 2.5. In some cases, both the polyol and isocyanate each have an average functionality greater than 2.4 or 2.5. In some cases, only the isocyanate has an average functionality greater than 2.4 or 2.5, and the polyol component has an average functionality of about 2.0. In some cases, only the polyol has an average functionality greater than 2.4 or 2.5, and the isocyanate component has an average functionality of about 2.0.

The isocyanate index is defined as the molar content of isocyanate functional groups divided by the hydroxyl functional groups. The crosslinked polyurethane is preferably prepared with an isocyanate index between 0.6 and 1.2 or between 0.7 and 1.1 or between 0.75 and 1.05.

In some cases, the isocyanate component can contain uretdione functionality. Under appropriate conditions, excess hydroxyl groups can react with the uretdione functional groups for form an allophanate group that further enhances crosslinking. When uretdione functional groups are present, an alternative index can be calculated by dividing the sum of the moles of isocyanate functional groups and uretdione functional groups by the moles hydroxyl functional groups. In some embodiments, it is preferable that this alternative index be between 0.8 and 1.2 or between 0.85 and 1.1 or between 0.90 and 1.0.

The degree of crosslinking of the polyurethane core layer can be related to the amount of gel content in the urethane. The gel content can be measured by submerging a sample of urethane in a solvent, such as refluxing THF, to extract the non-gel component. The gel content can then be measured gravimetrically by dividing the remaining dried weight after extraction by the weight of sample before extraction. In some embodiments, the core layer can have a gel content of greater than 80%, or greater than 90%, or greater than 95%.

The reactive mixture used to form the cross-linked polyurethane layer also contains a catalyst. The catalyst facilitates the step-growth reaction between the polyol and the polyisocyanate. Conventional catalysts generally recognized for use in the polymerization of urethanes may be suitable for use with the present disclosure. For example, aluminum-based, bismuth-based, tin-based, vanadium-based, zinc-based, or zirconium-based catalysts may be used. Tin-based catalysts are particularly useful. Tin-based catalysts have been found to significantly reduce the amount of outgassing present in the polyurethane. Most desirable are dibutyltin compounds, such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. In particular, the dibutyltin dilaurate catalyst DABCO T-12, commercially available from Air Products and Chemicals, Inc., Allentown, Pa. is particularly suitable. The catalyst is generally included at levels of at least 200 ppm or even 300 ppm or greater.

In some embodiments, it is desirable for the glass transition temperature of the cross-linked polyurethane layer (or core layer) to be 10 degrees Celsius or less, or 5 degrees Celsius or less, or 0 degrees Celsius or less, or −5 degrees Celsius or less, or −10 degrees Celsius or less, or in a range from −40 to 5 degrees Celsius, or in a range from −30 to 5 degrees Celsius, or in a range from −20 to 5 degrees Celsius, or in a range from −15 to 5 degrees Celsius. In some cases, it is also desirable that the crosslinked material have a high Tan Delta (>0.5, >0.8, >1.0 or greater than 1.2).

The transparent cross-linked polyurethane layer may have a cross-link density in a range from 0.1 to 1.0 mol/kg or from 0.2 to 0.9 mol/kg or from 0.37 to 0.74 mol/kg. The crosslink density of the cured polyurethane coatings is calculated using the method described in Macromolecules, Vol. 9, No. 2, pages 206-211 (1976). To implement this model, integral values for chemical functionality are required. DESMODUR N3300 is reported to have an average functionality of 3.5 and an isocyanate equivalent weight of 193 g/equiv. This material was represented in the mathematical model as a mixture of 47.5 wt % HDI trimer (168.2 g/equiv.), 25.0 wt % HDI tetramer (210.2 g/equiv.), and 27.5 wt % of HDI pentamer (235.5 g/equiv.). This mixture yields an average equivalent weight of 193 g/equiv. and an average functionality of 3.5. Desmodur N3400 is reported to have an average functionality 2.5 and an equivalent weight of 193, and it is reported to be blend of the HDI isocyanurate trimer and HDI uretdione dimer. This material was represented in the mathematical model as a mixture of 19 wt % HDI isocyanurate trimer, 33 wt % HDI uretdione dimer, and 10 wt % of HDI uretdione trimer and 38 wt % of HDI tetramer having one isocyanurate group and one uretdione group. In the mathematical model, the functionality was determined by the sum the isocyanate groups and the uretdione groups in the cases where there was an excess of hydroxyl groups relative to the sum of the isocyanate and uretdione groups.

In some embodiments, the cross-linked polyurethane layer may be formed of a plurality of layers, each layer being a cross-linked polyurethane material and at least two of these layers having a different glass transition temperature value. These layers may have a different glass transition temperature value by at least 2 degrees Celsius, or at least 5 degrees Celsius, or at least 10 degrees Celsius, for example. In some cases, the crosslinked polyurethane peak Tan Delta values may occur at different frequencies at a specified temperature.

The transparent cross-linked polyurethane layer has a thickness of at least 50 micrometers or at least 75 micrometers. The transparent cross-linked polyurethane layer has a thickness in a range from 75 to 200 micrometers, or 100 to 200 micrometers, or from 150 to 200 micrometers. The thickness of the transparent cross-linked polyurethane layer is a balance between being thick enough to provide the desired protection to the display and thin enough to provide the dynamic parameters and reduced thickness design parameters.

The hardcoat layer has a thickness of less than 50 micrometers or less than 40 micrometers. The hardcoat layer has a thickness in a range from 2 to 30 micrometers, or from 2 to 15 micrometers, or from 3 to 10 micrometers. The hardcoat layer includes nanoparticles.

Suitable hardcoats can include a variety of cured polymeric materials having inorganic nanoparticles. These hardcoats can include but are not limited to (meth)acrylic based hardcoats, siloxane hardcoats, polyurethane hardcoats and the like.

One preferable class of hardcoats include acrylic hardcoats comprising inorganic nanoparticles. Such hardcoats can have a polymerizable resin composition comprising mixtures of multifunctional (meth)acrylic monomers, oligomers, and polymers, where the individual resins can be monofunctional, difunctional, trifunctional, tetrafunctional or have even higher functionality. In preferred cases, the polymerizable (meth)acrylate components of the resin system are chosen such that when polymerized the hardcoat contains little to no free (meth)acrylic monomers.

Useful multifunctional (meth)acrylate monomers and oligomers include:

(a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containin monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl monomers such as, for example, urethane acrylates, polyester acrylates, and epoxy acrylates can also be employed.

Such (meth)acrylate monomers are widely available from vendors such as, for example, Sartomer Company of Exton, Pa.; Cytec Industries of Woodland Park, N; and Aldrich Chemical Company of Milwaukee, Wis.

In some embodiments, the hardcoat composition comprises at least one (e.g. solely) a crosslinking agent (meth) acrylate monomer comprising at least three (meth)acrylate functional groups. In some embodiments, the crosslinking monomer comprises at least four, five or six (meth)acrylate functional groups. Acrylate functional groups tend to be favored over (meth)acrylate functional groups.

Preferred commercially available crosslinking agent include for example trimethylolpropane triacrylate (commercially available from Sartomer Company, Exton, Pa. under the trade designation "SR351"), ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494"), dipentaerythritol hexaacrylate, and tris(2-hydroxy ethyl) isocyanurate triacrylate (from Sartomer under the trade designation "SR368". In some embodiments, the second (e.g. crosslinking) monomer does not comprise C2-C4 alkoxy repeat units.

The hardcoat composition may include surface modified inorganic oxide particles that add mechanical strength and durability to the resultant coating. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat.

The size of inorganic oxide particles is chosen to avoid significant visible light scattering.

The hardcoat composition may comprises a significant amount of surface modified inorganic oxide nanoparticles having an average (e.g. unassociated) primary particle size or associated particle size of at least 10, 20, 30, 40 or 50 nm and no greater than about 200, 175 or 150 nm. When the hardcoat composition lacks a significant amount of inorganic nanoparticles of such size, the cured hardcoat can crack when subjected to the pencil hardness test. The total concentration of inorganic oxide nanoparticles is typically a least 30, 35, or 40 wt-% solids and generally no greater than 90 wt-%, 80 wt-%, or 75 wt-% and in some embodiments no greater than 70 wt-%, or 65 wt-%, or 60 wt-% solids.

The hardcoat composition may comprise up to about 10 wt-% solids of smaller nanoparticles. Such inorganic oxide nanoparticles typically having an average (e.g. unassociated) primary particle size or associated particle size of at least 1 nm or 5 nm and no greater than 50, 40, or 30 nm.

The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, or a core of an oxide of one type (or a core of a material other than a metal oxide) on which is deposited an oxide of another type. Silica is a common inorganic particle utilized in hardcoat compositions. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid).

Aqueous colloidal silicas dispersions are commercially available from Nalco Chemical Co., Naperville, Ill. under the trade designation "Nalco Collodial Silicas" such as products 1040, 1042, 1050, 1060, 2327, 2329, and 2329K or Nissan Chemical America Corporation, Houston, Tex. under the trade name Snowtex™. Organic dispersions of colloidal silicas are commercially available from Nissan Chemical under the trade name Organosilicasol™. Suitable fumed silicas include for example, products commercially available from Evonki DeGussa Corp., (Parsippany, N.J.) under the trade designation, "Aerosil series OX-50", as well as product numbers -130, -150, and -200. Fumed silicas are also commercially available from Cabot Corp., Tuscola, Ill., under the trade designations CAB-O-SPERSE 2095", "CAB-O-SPERSE A105", and "CAB-O-SIL M5".

It may be desirable to employ a mixture of inorganic oxide particle types to optimize an optical property, material property, or to lower that total composition cost.

As an alternative to or in combination with silica the hardcoat may comprise various high refractive index inorganic nanoparticles. Such nanoparticles have a refractive index of at least 1.60, 1.65, 1.70, 1.75, 1.80, 1.85, 1.90, 1.95, 2.00 or higher. High refractive index inorganic nanoparticles include for example zirconia ("$ZrO_2$"), titania ("$TiO_2$"), antimony oxides, alumina, tin oxides, alone or in combination. Mixed metal oxide may also be employed.

Zirconias for use in the high refractive index layer are available from Nalco Chemical Co. under the trade designation "Nalco OOSS008", Buhler AG Uzwil, Switzerland under the trade designation "Buhler zirconia Z—WO sol" and Nissan Chemical America Corporation under the trade name NanoUse ZR™. Zirconia nanoparticles can also be prepared such as described in U.S. Patent Publication No. 2006/0148950 and U.S. Pat. No. 6,376,590. A nanoparticle dispersion that comprises a mixture of tin oxide and zirconia covered by antimony oxide (RI −1.9) is commercially available from Nissan Chemical America Corporation under the trade designation "HX-05M5". A tin oxide nanoparticle dispersion (RI −2.0) is commercially available from Nissan Chemicals Corp. under the trade designation "CX-S401M". Zirconia nanoparticles can also be prepared such as described in U.S. Pat. Nos. 7,241,437 and 6,376,590.

The inorganic nanoparticles of the hardcoat are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of their surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependent upon several factors such as particle size, particle type, modifier molecular wt, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

The silane surface treatments comprise one or more alkoxy silane groups when added to the inorganic oxide (e.g. silica) dispersions. The alkoxy silane group(s) hydrolyze with water (present in the nanoparticle dispersion) to form Si—OH, (hydroxy groups). These SiOH groups then react with SiOH groups on the nano-silica surface to form silane surface treated nano-silica.

In some embodiments, the inorganic oxide (e.g. silica) nanoparticles are separately surface modified with a (e.g. copolymerizable or non-polymerizable) silane surface treatment and the hardcoat comprises a mixture of both types of surface modified inorganic oxide (e.g. silica) nanoparticles. In other embodiments, the inorganic oxide (e.g. silica) nanoparticles are concurrently surface modified with both a copolymerizable and a non-polymerizable silane surface treatment.

The inorganic oxide (e.g. silica) nanoparticles comprise at least one copolymerizable silane surface treatment. The copolymerizable silane surface treatment comprises a free-radically polymerizable group, such as a meth(acryl) or vinyl. The free-radically polymerizable group copolymerizes with the free-radically polymerizable (e.g. (meth)acrylate) monomers of the hardcoat composition.

Suitable (meth)acryl organosilanes include for example (meth)acryloyl alkoxy silanes such as 3-(methacryloyloxy)propyltrimethoxysilane, 3-acryloylxypropyltrimethoxysilane, 3-(methacryloyloxy)propylmethyldimethoxysilane, 3-(acryloyloxypropyl)methyl dimethoxysilane, 3-(methacryloyloxy)propyldimethylmethoxysilane, and 3-(acryloyloxypropyl)dimethylmethoxysilane. In some embodiments, the (meth)acryl organosilanes can be favored over the acryl silanes. Suitable vinyl silanes include vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane and the like.

Suitable non polymerizable surface treatments include methyltrimethoxysilane, methyltriethoxysilane, propyltriethoxysilane, isopropyltriethoxysilane, isooctyltriethoxysilane, phenyltriemethoxy silane, cyanopropyltrimethoxysilane, and the like.

To facilitate curing of the hardcoat, polymerizable compositions described herein may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Useful free-radical photoinitiators include, for example, those known as useful in the UV cure of acrylate polymers such as described in WO2006/102383.

The hardcoat composition may optionally comprise various additives. For example, silicone or fluorinated additive may be added to lower the surface energy of the hardcoat. In one embodiment, the hardcoat coating composition further comprises at least 0.005 and preferably at least 0.01 wt-% solids of one or more perfluoropolyether urethane additives, such as described in U.S. Pat. No. 7,178,264. The total amount of perfluoropolyether urethane additives alone or in combination with other fluorinated additives typically ranges from to 0.05% to 1 wt-% solids.

The perfluoropolyether urethane material is preferably prepared from an isocyanate reactive HFPO— material. Unless otherwise noted, "HFPO—" refers to the end group $F(CF(CF_3)CF_2O)_aCF(CF_3)$— of the methyl ester $F(CF(CF_3)CF_2O)_aCF(CF_3)C(O)OCH_3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. For example, in one embodiment, "a" averages 6.2. The molecular weight of the HFPO— perfluoropolyether material varies depending on the number ("a") of repeat units from about 940 g/mole to about 1600 g/mole, with 1 100 g/mole to 1400 g/mole typically being preferred.

Certain silicone additives have also been found to provide ink repellency in combination with low lint attraction, as described in WO 2009/029438; incorporated herein by reference. Such silicone (meth)acrylate additives generally comprise a polydimethylsiloxane (PDMS) backbone and at least one alkoxy side chain terminating with a (meth)acrylate group. The alkoxy side chain may optionally comprise at least one hydroxyl substituent. Such silicone (meth)acrylate additives are commercially available from various suppliers such as Tego Chemie under the trade designations TEGO Rad 2300 "TEGO Rad 2250", "TEGO Rad 2300", "TEGO Rad 2500", and "TEGO Rad 2700". Of these, "TEGO Rad 2100" provided the lowest lint attraction.

The transparent polymeric substrate layer has a thickness greater than 10 micrometers or less than 200 micrometers. The transparent polymeric substrate layer has a thickness in a range from 10 to 125 micrometers, or from 25 to 100 micrometers, or from 30 to 85 micrometers. The transparent polymeric substrate layer may have a yield stress value greater than 70 MPa, or greater than 90 MPa, or greater than 120 MPa, or greater than 160 MPa. The phrase "yield stress" or "offset yield stress" refers herein to "0.2% offset yield strength" as defined in ASTM D638-14. ASTM D638-14 section A2.6 defines the test method for "offset yield strength" and is defined as the stress at which the strain exceeds by a specified amount (the offset) an extension of the initial proportional portion of the stress-strain curve. It is expressed in force per unit area, usually megapascals (pounds force per square inch).

The transparent polymeric substrate layer may be formed of any useful polymeric material that provides the desired mechanical properties (such as dimensional stability) and optical properties (such as light transmission and clarity) to the display film. Examples of materials suitable for use in the polymeric substrate layer include polymethylmethacrylate, polycarbonate, polyamides, polyimide, polyesters (PET, PEN), polycyclic olefin polymers, and thermoplastic polyurethanes.

One useful polymeric material for forming the transparent polymeric substrate layer is polyimide. In many embodiments the polyimide substrate layer is colorless. Colorless polyimide can be formed via chemistry or via nanoparticle incorporation. Some exemplary colorless polyimides formed via chemistry are described in WO 2014/092422.

The transparent polymeric substrate layer may be primed or treated to impart some desired property to one or more of its surfaces. In particular the transparent polymeric substrate layer can be primed to improve adhesion of the transparent polyurethane material with the transparent polymeric substrate layer. Examples of such treatments include corona, flame, plasma and chemical treatments such as, acrylate or silane treatments.

The transparent polyurethane material may be coated onto the transparent polymeric substrate layer (that may be primed) and then be cured or cross-linked to form a thermoset or cross-linked polyurethane layer. The polyurethanes described herein are thermosetting polymers that do not melt when heated.

The transparent protective layer may be an abrasion resistant layer. This layer may have a thickness in a range from 2 to 100 micrometers, or from 2 to 50 micrometers, or from 4 to 25 micrometers, or from 4 to 12 micrometers. In many cases, the abrasion resistant layer comprises a hardcoat layer, as described above. The hardcoat may comprise any chemistry that provides suitable abrasion resistance properties. Examples of suitable chemistries include but are not limited to acrylic hardcoats, polyurethane hardcoats, siloxane hardcoats, ene-thiol based hardcoats and the like. In many cases the abrasion resistant layer comprises inorganic nanoparticles which may be surface functionalized for compatibility and or reactivity.

Abrasion is a method of wearing down or rubbing away material by means of friction. The abrasion resistance of a material helps it to withstand mechanical action and tends to protect the removal of materials from its surface. This allows the material to retain its integrity and hold its form. Abrasion resistance can be measured by rubbing or wiping the transparent protective layer for a specified number of cycles with a rough material such as steel wool or a scouring pad and then inspecting the layer for visible changes such as fine scratches or haze.

Figure 10:
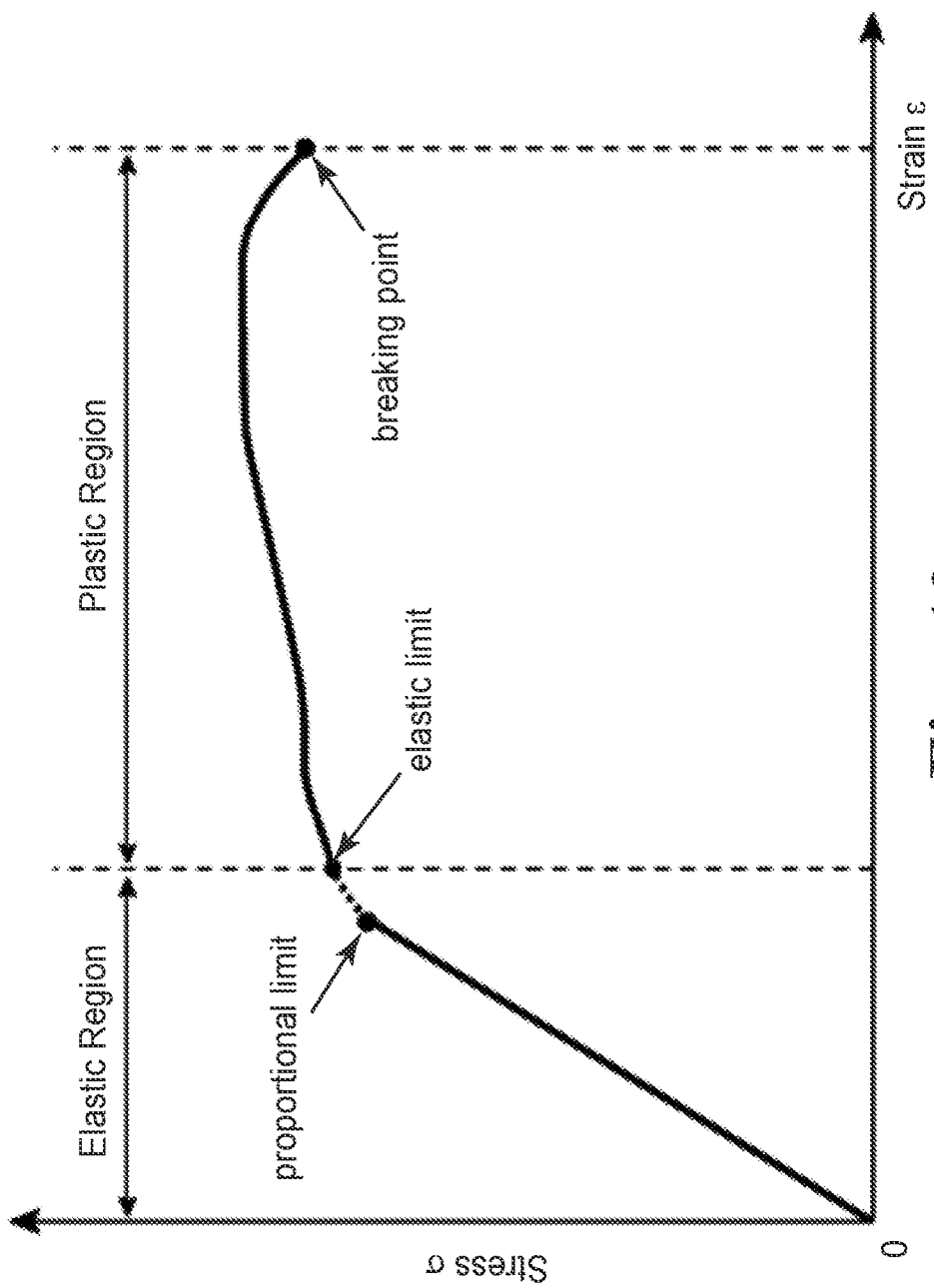
FIG. 10 is a graph of strain versus stress.

The transparent protective layer may be an elastic nanocomposite layer. This layer may have a thickness in a range from 30 to 125 micrometers. This elastic nanocomposite material can be made from any useful material that provides durable surface properties to the outer layer. In some cases, this elastic nanocomposite layer is made from polyurethane nanocomposite materials such as silica nanoparticle filled UV curable polyurethane resins. In other embodiments the elastic nanocomposite material can be made from nanoparticle filled ionic elastomer materials. This elastic nanocomposite layer is capable of stretching within an elastic range, so that permeant deformation does not occur. The proportional limit for a material is defined as the maximum stress at which the stress is proportional to strain (Hooke's law). The elastic limit is the minimum stress at which permanent deformation can be measured. The elastic nanocomposite layer may have a strain at the elastic limit that is 20% greater than the strain at the proportional limit, 50% greater than the strain at the proportional limit, or 100% greater than the strain at the proportional limit. FIG. 10 illustrates this concept.

The overall thickness of the display film described herein may have any useful value depending on the application. The thickness of the display film is a balance between being thick enough to provide the desired display protection and thin enough to provide the folding and reduced thickness design parameters. When the display film folds upon itself, then this film may have a total thickness in a range from 85 to 350 micrometers or from 100 to 300 micrometers or from 150 to 250 micrometers. When the display film moderately flexes, then this film may have total thickness in a range from 300 to 500 micrometers. When the display film is curved but does not appreciably flex, then this film may have total thickness in a range from 500 to 1000 micrometers.

The display film can includes one or more additional layers. These optional layers may include a transparent barrier layer (thickness from 3 to 200 nanometers), a microstructure layer, an anti-glare layer, anti-reflective layer, or an anti-fingerprint layer.

The hardcoat layer 15 may be disposed on either side of one or both of the transparent polymeric substrate layer 12 or the transparent aliphatic cross-linked polyurethane layer 14. The hardcoat layer may include a multi-functional acrylate resin with at least 30% wt nanosilica particles. WO2014/011731 describes some exemplary hardcoats.

The transparent barrier layer may be disposed on either side of one or both of the transparent polymeric substrate layer 12 and the transparent aliphatic cross-linked polyurethane layer 14. The transparent barrier layer can mitigate or slow ingress of oxygen or water through the display film. Transparent barrier layers may include for example, thin alternating layers of silica, alumina or zirconia together with an organic resin. Exemplary transparent barrier layer are described in U.S. Pat. No. 7,980,910 and WO2003/094256.

In one embodiment, the display film includes a transparent polymeric substrate layer (having a thickness in a range from 35 to 75 micrometers) and a transparent cross-linked polyurethane layer (having a thickness in a range from 100 to 200 micrometers) disposed on the transparent polymeric substrate layer. A hardcoat layer (having a thickness is a range from 4 to 10 micrometers) is disposed on the transparent polymeric substrate layer. The transparent cross-linked polyurethane layer has a glass transition temperature of less than 0 degrees Celsius, and a Tan Delta peak value greater than 1.0. The display film has a haze value of 1% or less.

The display film may have a haze value of 2% or less, or 1.5% or less, or 1% or less, or 0.5% or less. In some embodiments the display film 10 may have a haze value of 5% or less. The display film may have a clarity of 98% or greater, or 99% or greater. The display film may have a visible light transmission of 85% or greater, or 90% or greater, or 93% or greater.

The display film may have a yellow index or b* value of 5 or less, or 4 or less, or 3 or less, or 2 or less, or 1 or less. In many embodiments the display film may have a yellow index or b* value of 1 or less.

The display film may maintain a haze value of 2% or less, or 1.5% or less, or 1% or less after at least 10,000, 25,000, 50,000 or 100,000 bending or folding cycles about a 3 mm radius. The display film may maintain a stable haze value, or remain intact without cracking or delaminating, after at least 10,000, 25,000, 50,000 or 100,000 bending or folding cycles about a 5 mm radius, or about a 4 mm radius, or about a 3 mm radius, or about a 2 mm radius, or about a 1 mm radius. The display film may remain intact after at least 10,000, 25,000, 50,000 or 100,000 bending or folding cycles about a 3 mm radius or less.

Objects and advantages of this disclosure are further illustrated by the following examples, but the particular materials and amounts thereof recited in these examples, as well as other conditions and details, should not be construed to unduly limit this disclosure.

EXAMPLES

All parts, percentages, ratios, etc. in the examples are by weight, unless noted otherwise. Solvents and other reagents used were obtained from Sigma-Aldrich Corp., St. Louis, Mo. unless specified differently.

A series of cross-linked polyurethane materials were prepared on a 50 micrometer layer of low melt PEN (LmPEN) transparent film. For some examples, the LmPEN film was coated with a UV curable, silica filled acrylate hardcoat layer. In other examples, the polyurethane reactive material was coated directly on corona treated LmPEN using a specified liner. Each construction was characterized using the test methods described below.

TABLE 1

Materials

| Abbreviation or Trade Designation | Description |
|---|---|
| K-FLEX 188 "Polyol 1" | Aliphatic polyester polyol, commercially available from King Industries, Norwalk, CT under the trade name "K-FLEX 188" |
| DESMODUR N3300A | Aliphatic polyisocyanate, commercially available from Bayer, Pittsburgh, PA under the trade name "DESMODUR N3300A". |
| DABCO T-12 | Dibutyltin dilaurate catalyst, commercially available from Air Products and Chemicals, Inc., Allentown, PA, under the trade name "DABCO T-12". |
| Desomodur N3400 | Aliphatic polyisocyanate, commercially available from Bayer, Pittsburgh, PA under the trade name "DESMODUR N3300A". |
| SR399 | Dipentaerythritol penta acrylate, commercially available from the Sartomer Arkema Group, Exton, PA |
| SR444c | Pentaerythritol triacrylate and pentaerythritol tetraacrylate mixture, commercially available from the Sartomer Arkema Group, Exton, PA |
| SR9035 | Ethoxylated (15) Trimethylolpropane Triacrylate, commercially available from the Sartomer Arkema Group, Exton, PA. |
| SR344 | Polyethylene glycol 400 diacrylate, commercially available from the Sartomer Arkema Group, Exton, PA. |
| Irgacure 184 | Photoinitiator, BASF |
| PM-1501 | Wood protector, commercially available from 3M, St. Paul, MN |
| LmPEN Film | Low melt polyethylene napthalate polymer (co-polyester made from 90% NDC (dimethyl-2,6-naphthalenedicarboxylate) and 10% terephthalic acid, extruded and biaxially oriented at 3M |

Preparation of Primed LmPEN Film

A primer solution was made by mixing 52.5 grams of Vitel 2200B (Bostik Americas, Wauwatosa, Wis.) in 2447.5 grams of methyl ethyl ketone (Fisher scientific) to make a homogeneous solution. The primer solution was applied to 37.5 micrometer and 50 micrometer LmPEN films in a roll to roll process where the primer solution was metered through a slot die onto the moving web. Thickness was controlled by the use of a metering pump and a mass flow meter. The volatile components of the coating were then dried in a 3 zone air floatation zone oven (ovens temperatures set all set to 175° F.). The dried coating was wound into a roll and the primer coating had a thickness of approximately 81 nm.

Preparation of High Index Hardcoat Solution

To a 1 gallon jar was added 1440.7 grams of 10 nm surface functionalized zirconia nanoparticles (as described in U.S. Pat. No. 7,241,437) in 1-methoxy-2-propanol (at 59.0% by weight). To the solution was added 65.00 grams of SR399, 65 grams of SR601, 409.3 grams of methylethyl-ketone and 20.0 grams of Irgacure 184. The solution was stirred for 30 minutes to produce a solution at 50% solids by weight.

Preparation of ¼ Wavelength Primed LmPEN Film

A primer solution was made by mixing 23.2 grams of High Index Hardcoat Solution and 3.6 grams of WB50 sulphonated polyester resin (3M) in 155.5 grams of methyl ethyl ketone (Fisher scientific) and 467.7 grams of Cyclohexanone to make a homogeneous solution. The primer solution was applied to 37.5 micrometer, 50 micrometer and 69 micrometer LmPEN films in a roll to roll process where the primer solution was metered through a slot die onto the moving web. Thickness was controlled by the use of a metering pump and a mass flow meter. The volatile components of the coating were then dried in a 3 zone air floatation zoned oven (ovens temperatures set all set to 175° F.). The dried coating was then wound into a roll and the primer coating had a thickness of approximately 100 nm.

Preparation of Hardcoated Film 1

A hardcoat solution was made by mixing 37.79 grams of Esacure 1 (Lamberti, Gallarate, Italy), 2729.62 grams of A174 functionalized 20 nm silica particles (45% by weight in 1-methoxy-2-propanol), 909.87 grams of methyltrimethoxysilane functionalized 20 nm silica particles (45% by weight in 1-methoxy-2-propanol), 259.25 grams of SR399, 348.99 grams of SR9035, 478.62 grams of SR444c, 42.88 grams of SR344 in 1430.98 grams of methyl ethyl ketone (Fisher scientific). The solution was stirred until all components were dissolved. To the solution was added 11.99 g of PM-1501 (3M) and the solution was stirred for another 20 minutes. The resulting solution was essentially homogeneous with a clear bluish appearance. The hardcoat solution was applied to a 2 mil LmPEN film in a roll to roll process where the solution was metered through a slot die onto the moving web. Thickness was controlled by the use of a metering pump and a mass flow meter. The volatile components of the coating were dried in a 3 zone air floatation zone oven (ovens temperatures set all set to 175° F.). The dried coating was cured with an in-line 600 W/in Fusion UV curing station with a dichroic reflector, H bulb, nitrogen inerting, and chilled backup roll. The cured coating was wound into a roll.

Preparation of Hardcoated Film 2

A hardcoat solution was made by mixing 37.79 grams of Esacure 1 (Lamberti, Gallarate, Italy), 2729.62 grams of A174 functionalized 20 nm silica particles (45% by weight in 1-methoxy-2-propanol), 909.87 grams of methyltrimethoxysilane functionalized 20 nm silica particles (45% by weight in 1-methoxy-2-propanol), 259.25 grams of SR399, 348.99 grams of SR9035, 478.62 grams of SR444c, 42.88 grams of SR344 in 1430.98 grams of methyl ethyl ketone (Fisher scientific). The solution was stirred until all components were dissolved. To the solution was added 11.99 g of PM-1501 (3M) and the solution was stirred for another 20 minutes. The resulting solution was essentially homogeneous with a clear bluish appearance. The hardcoat solution was applied to a 1.5 mil LmPEN film in a roll to roll process where the solution was metered through a slot die onto the moving web. Thickness was controlled by the use of a metering pump and a mass flow meter. The volatile components of the coating were dried in a 3 zone air floatation zone oven (ovens temperatures set all set to 175° F.). The dried coating was cured with an in-line 600 W/in Fusion UV curing station with a dichroic reflector, H bulb, nitrogen inerting, and chilled backup roll. The cured coating was wound into a roll.

Preparation of the Polyol and Catalyst Mixture

In an air mixer at 93° C. were mixed 470 grams of Polyol-1 (K-FLEX 188 or K188) and 4 drops of Catalyst. To reduce the resultant air bubbles, the mixture was then placed in a vacuum oven overnight at 60° C.

Examples 1-4: Polyurethane Resin and Polyurethane Film

For examples 1-4, the components listed in Table 2 were added to speed mix cup and they were mixed at 1500 rpom for ~1 minute. The solutions were used with 5 min of mixing of the isocyanates and polyol with catalyst. The reactive 2 part urethanes were cast between silicone coated release liners at an ~thickness of 200 microns and were cured at 70° C. for 10 minutes followed by a postbake at 85° C. for 19 hours. The resulting cured polyurethane films were stripped of the silicone liners and were measured using Dynamic Mechanical Analysis and reported in Table 3.

Examples 5-16: Preparation of Cover Sheet Films

Cover Sheet films were prepared in a roll to roll process where the isocyanate and polyol with catalyst were mixed using an inline static mixer. The solutions were applied to a moving web between a silicone release liner with ~thickness of 2 mil and the hardcoated films described above where the solution contacted the non-hardcoat side of the film and pulled under a notch bar with a gap tuned to produce the desired thickness of the cover sheet film output. The coated polyurethane between films were heated at 70° C. and wounded into a roll. The films were postbaked at 75° C. for 72 hours prior to testing. The mix ratios and details of for each example are shown in Table 4. Properties of the films (THC refers to transmission/haze/clarity) are shown in Table 5.

TABLE 2

Mix ratios for polyurethanes for Examples 1-4

| Example | K188 | N3300 | N3400 | NCO/OH Ratio | (NCO + UD)/OH Ratio[1] | Theoretical Gel Content | Theoretical Crosslink Concentration |
|---|---|---|---|---|---|---|---|
| 1 | 62.8 | 0 | 37.2 | 0.75 | 1.03 | 100% | 0.74 |
| 2 | 62.4 | 18.8 | 18.8 | 0.76 | 0.91 | 99.3% | 0.55 |
| 3 | 65.2 | 17.4 | 17.4 | 0.67 | 0.80 | 96.5% | 0.37 |
| 4 | 62.5 | 25.0 | 12.5 | 0.76 | 0.85 | 98.3% | 0.45 |

[1]Note that the N3400 isocyanate contains a uretdione unit that can react with excess OH in the polyol component at elevated temperature to form an allophanate group.
For this reason, the table contains two stoichiometric ratio columns.
The first calculates the NCO/OH ratio based on only existing NCO content in N3300 and N3400 at the beginning of the reaction.
The NCO + UD/OH ratio accounts for the ratio after the uretdione is reacted with excess OH of the polyol.

TABLE 3

Data for examples 1-4 (Data being measured)

| Example | Onset Tg by DMA | Tg Peak Tan delta | Storage Modulus @ 21° | Storage Modulus @ −20° C. | Peak tan delta |
|---|---|---|---|---|---|
| 1 | 7° C. | 16° C. | 12 MPa | 1363 MPa | 1.76 |
| 2 | 11° C. | 26° C. | 112 MPa | 1615 MPa | 1.76 |
| 3 | 6° C. | 21° C. | 21 MPa | 1538 MPa | 1.87 |
| 4 | 5° C. | 19° C. | 13 MPa | 1748 MPa | 1.48 |

TABLE 4

Films and mix conditions used to make HC integrated Cover Sheet Films Example 5-16

| Example | Top Substrate | Gap (mils) | N3400/N3300 ratio | NCO/OH index | NCO + UD/OH Index | Tg by Onset DSC | Thickness (micron) |
|---|---|---|---|---|---|---|---|
| 5 | HC film 1 | 4.50 | 1:0 | 0.75 | 1.03 | 8° C. | 176 |
| 6 | HC film 1 | 5.30 | 1:0 | 0.75 | 1.03 | 8° C. | 201 |
| 7 | HC film 2 | 5.30 | 1:0 | 0.75 | 1.03 | 8° C. | 185 |
| 8 | HC film 2 | 4.50 | 1:0 | 0.75 | 1.03 | 8° C. | 211 |
| 9 | HC film 2 | 4.50 | 2:1 | 0.76 | 0.95 | 10° C. | 216 |
| 10 | HC film 2 | 5.30 | 2:1 | 0.76 | 0.95 | 10° C. | 190 |
| 11 | HC film 1 | 5.30 | 2:1 | 0.76 | 0.95 | 10° C. | 179 |
| 12 | HC film 1 | 4.50 | 2:1 | 0.76 | 0.95 | 10° C. | 202 |
| 13 | HC film 1 | 4.50 | 1:1 | 0.67 | 0.80 | 1° C. | 207 |
| 14 | HC film 1 | 5.30 | 1:1 | 0.67 | 0.80 | 1° C. | 177 |
| 15 | HC film 2 | 5.30 | 1:1 | 0.67 | 0.80 | 1° C. | 181 |
| 16 | HC film 2 | 4.50 | 1:1 | 0.67 | 0.80 | 1° C. | 206 |

TABLE 5

Cover Sheet Films Example 5-16 measured properties (To be measured)

| Example | THC (BYK Gardner Hazegard Plus) | Abrasion Resistance (Steel Wool 0000) | Low Temperature Dynamic Folding(−20° C.) Cycles to Failure Replicate A | Low Temperature Dynamic Folding(−20° C.) Cycles to Failure Replicate B | b* (yellow index) |
|---|---|---|---|---|---|
| 5 | 92.1/0.52/98.3 | NS | 73632 | 73632 | 0.74 |
| 6 | 92.0/0.55/98.3 | NS | 73632 | 46639 | 0.74 |

TABLE 5-continued

Cover Sheet Films Example 5-16 measured properties (To be measured)

| Example | THC (BYK Gardner Hazegard Plus) | Abrasion Resistance (Steel Wool 0000) | Low Temperature Dynamic Folding(−20° C.) | | b* (yellow index) |
|---|---|---|---|---|---|
| | | | Cycles to Failure Replicate A | Cycles to Failure Replicate B | |
| 7  | 92.3/1.03/98.2 | NS | 73632 | 46639  | 0.59 |
| 8  | 92.2/1.16/98.2 | NS | 73632 | 46639  | 0.41 |
| 9  | 92.3/1.38/98.3 | NS | 30091 | 30091  | 0.57 |
| 10 | 92.3/1.37/98.3 | NS | 47974 | 30091  | 0.61 |
| 11 | 91.7/0.57/98.5 | NS | 79469 | >79469 | 0.74 |
| 12 | 91.9/0.55/98.5 | NS | 47974 | 47974  | 0.62 |
| 13 | 91.7/0.63/98.4 | NS | 23100 | 23100  | 0.69 |
| 14 | 91.6/0.71/98.5 | NS | 23100 | 23100  | 0.61 |
| 15 | 92.1/1.24/98.5 | NS | 23100 | 23100  | 0.52 |
| 16 | 91.6/1.50/98.2 | NS | 23100 | 23100  | 0.59 |

Polyurethane Layer Characterization

Glass Transition Temperature

The glass transition temperature of the polyurethane coatings was characterized using a TA Instruments Model Q2000 Differential Scanning calorimeter. The scans were taken at 2° C. per minute heating rate. A sample pan with a piece of the hard coated substrate was used as a reference. The results are shown in Table 4 above. The onset of the glass transition was determined per ASTM E1356-08 (2014).

Dynamic Mechanical Analysis Test Method

Samples were cut into strips 6.35 mm wide and about 4 cm long. The thickness of each film was measured. The films were mounted in the tensile grips of a Q800 DMA from TA Instruments with an initial grip separation between 16 mm and 19 mm. The samples were then tested at an oscillation of 0.2% strain and 1 Hz throughout a temperature ramp from −20° C. to 200° C. at a rate of 2° C. per minute. The temperature at which the Tan Delta signal reached a maximum was recorded as the peak Tan Delta temperature.

Transmission, Haze, and Clarity (THC)

Optical properties of the prepared examples were measured using a Hazegard instrument. Luminous transmission, clarity, and haze were measured according to ASTM D1003-00 using a Gardner Haze-Guard Plus model 4725 (available from BYK-Gardner Columbia, Md.). Each result in Table 5 is the average of three measurements on a given sample.

Yellow Index or b*

Yellowness was assessed by measuring b* with a D65 light source. Measurements were taken in transmission on a Konica Minolta Spectrophotometer model CM3700d. Results shown in Table 5.

Low Temperature Dynamic Folding Test

The durability of the protective films to multiple folding events at low temperature was evaluated using a dynamic fold tester. The dynamic fold tester has two coplanar plates where one of the plates is fixed and the other plate rotates to be overlapping and facing each other. The gap between the plates when closed was set to approximately 10 mm, thereby making the bend radius approximately 5 mm. 7"×1.5" pieces of each sample were laser converted and the liners removed. Two replicates of each sample construction were attached to the folding plates coating side up (polyurethane coating in compression) using 1.5" wide strips of a 50 micron thick silicone polyurea optically clear adhesive. The silicone polyurea optically clear adhesive was prepared as described in Example 4 of WO2016/196460. The tape was applied to the plates such that there was a free zone approximately 12.5 mm wide on either side of the folding axis where the film was unconstrained. The entire folding apparatus was placed into an environmental chamber and then cooled to −20 degrees Celsius at 0.7 C/min. Once the chamber reached its set point, the folding rate was set to approximately 20 folds/min and the test run for 100,000 cycles or until all the samples had failed. The samples were visually inspected through the window of the environmental chamber every 10,000-25,000 cycles for evidence of failure such as coating cracking, delamination or haze. The results are shown in Table 5.

Abrasion Testing

Abrasion of the samples was tested cross web to the coating direction using a mechanical device capable of oscillating an abrasive material adhered to a stylus across each sample's coated surface. The stylus oscillated over a 60 mm wide sweep width at a rate of 210 mm/sec (2 wipes/second), where a wipe is defined as a single travel of 60 mm. The stylus was a cylinder with a flat base and a diameter of 3.2 cm. The abrasive material used for this test was steel wool that was obtained from Rhodes-American (a division of Homax Products, Bellingham, Wash.) under the trade designation "#0000-Super-Fine" and was used as received.

Figure 9:
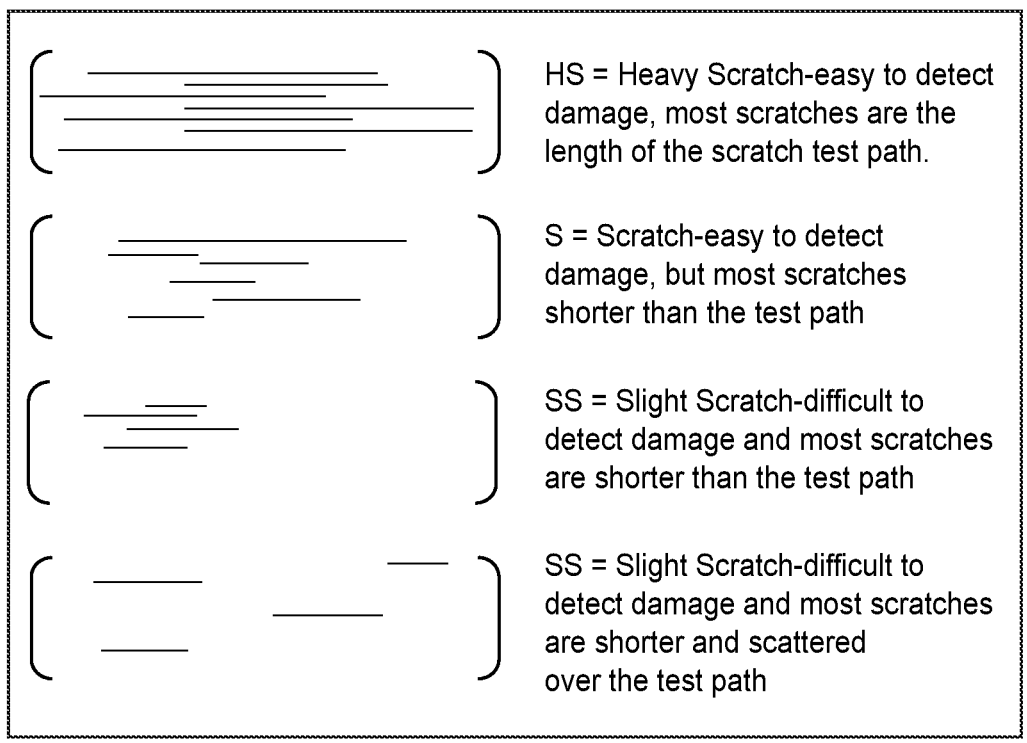
FIG. 9 is a visual standard for the abrasion test.

Disks of diameter 3.2 cm were cut from the pads and adhered to the base of the stylus using 3M Scotch Permanent Adhesive Transfer tape. A single sample was tested for each example with a 1.5 kg weight and 100 and 1000 wipes. After abrasion, samples were graded visually for scratch based on the visual standard shown below in FIG. 9. HS refers to heavy scratch. S refers to scratch. SS refers to slight scratch. NS refers to no visible scratch. Results are shown in Table 5.

Thus, embodiments of LOW Tg POLYURETHANE PROTECTIVE DISPLAY FILM are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A display film comprising:
   a transparent polymeric substrate layer; and
   a transparent cross-linked polyurethane layer disposed on the transparent polymeric substrate layer, the transparent cross-linked polyurethane layer having a glass transition temperature of 10 degrees Celsius or less and a Tan Delta peak value of 0.5 or greater.

2. The display film according to claim 1, further comprising a hardcoat layer disposed on the transparent polymeric substrate layer, and the transparent polymeric substrate layer separates the transparent cross-linked polyurethane layer from the hardcoat layer.

3. The display film according to claim 1, further comprising an adhesive layer disposed on the transparent cross-linked polyurethane layer, and the transparent cross-linked polyurethane layer separates the transparent polymeric substrate layer from the adhesive layer.

4. The display film according to claim 3, further comprising a release or removable liner disposed on the adhesive layer.

5. The display film according to claim 1, further comprising a second transparent polymeric substrate layer disposed on the transparent cross-linked polyurethane layer, and the transparent cross-linked polyurethane layer separates the transparent polymeric substrate layer from the second transparent polymeric substrate layer.

6. The display film according to claim 5, further comprising an adhesive layer disposed on the second transparent polymeric substrate layer, and the second transparent polymeric substrate layer separates the transparent cross-linked polyurethane layer from the adhesive layer.

7. The display film according to claim 6, further comprising a release or removable liner disposed on the adhesive layer.

8. The display film according to claim 1, wherein the transparent cross-linked polyurethane layer has a glass transition temperature of 5 degrees Celsius or less, or 0 degrees Celsius or less, or −5 degrees Celsius or less, or in a range from −40 to 5 degrees Celsius, or in a range from −30 to 5 degrees Celsius, or in a range from −20 to 5 degrees Celsius, or in a range from −15 to 5 degrees Celsius, or in a range from −10 to 5 degrees Celsius, or in a range from −5 to 5 degrees Celsius.

9. The display film according to claim 1, wherein the transparent cross-linked polyurethane layer has a Tan Delta peak value of 0.5 or greater, or 0.8 or greater, or 1.0 or greater, or 1.2 or greater, or in a range from 0.5 to 2.5, or in a range from 1 to 2.5, and the transparent cross-linked polyurethane layer has a cross-link density in a range from 0.1 to 1.0 mol/kg or from 0.2 to 0.9 mol/kg or from 0.37 to 0.74 mol/kg.

10. The display film according to claim 1, wherein the display film has a haze of 2.0% or less or 1.5% or less or 1.0% or less or 0.5% or less and a visible light transmission of 85% or greater, or 90% or greater.

11. The display film according to claim 1, wherein the transparent cross-linked polyurethane layer has a thickness in a range from 75 to 200 micrometers, or 100 to 200 micrometers, or from 150 to 200 micrometers.

12. The display film according to claim 6, wherein the hardcoat layer comprises nanoparticles and has a thickness in a range from 2 to 30 micrometers, or from 2 to 15 micrometers, or from 3 to 10 micrometers.

13. The display film according to claim 1, wherein the transparent polymeric substrate layer or the second transparent polymeric substrate layer, has a thickness in a range from 10 to 125 micrometers, or from 25 to 100 micrometers, or from 30 to 85 micrometers, and a yield stress value greater than 90 MPa, or greater than 100 MPa, or greater than 120 MPa, or greater than 160 MPa.

14. The display film according to claim 1, wherein the display film has a thickness in a range from 85 to 350 micrometers or from 100 to 300 micrometers or from 150 to 250 micrometers.

15. A display film comprising:
a transparent cross-linked polyurethane layer, the transparent cross-linked polyurethane layer having a glass transition temperature of 10 degrees Celsius or less and a Tan Delta peak value of 0.5 or greater; and
a transparent protective layer disposed on the transparent cross-linked polyurethane layer.

16. The display film according to claim 15, wherein the protective layer is a hardcoat layer comprising nanoparticles and having a thickness in a range from 2 to 30 micrometers, or from 2 to 15 micrometers, or from 3 to 10 micrometers.

17. The display film according to claim 15, wherein the protective layer is an abrasion resistant layer having a thickness in a range from 2 to 100 micrometers, or from 10 to 100 micrometers, or from 10 to 50 micrometers.

18. The display film according to claim 15, wherein the protective layer is an elastic nano-composite layer having a thickness in a range from 30 to 125 micrometers.

19. The display film according to claim 15, further comprising an adhesive layer disposed on the transparent cross-linked polyurethane layer, and the transparent cross-linked polyurethane layer separates the protective layer from the adhesive layer.

20. The display film according to claim 19, further comprising a release or removable liner disposed on the adhesive layer.

21. The display film according to claim 15, further comprising a transparent polymeric substrate layer disposed on the transparent cross-linked polyurethane layer, and the transparent cross-linked polyurethane layer separates the transparent polymeric substrate layer from the protective layer.

22. The display film according to claim 21, further comprising an adhesive layer disposed on the transparent polymeric substrate layer, and the transparent polymeric substrate layer separates the transparent cross-linked polyurethane layer from the adhesive layer.

23. The display film according to claim 22, further comprising a release or removable liner disposed on the adhesive layer.

24. The display film according to claim 15, wherein the transparent cross-linked polyurethane layer has a glass transition temperature of 10 degrees Celsius or less, or 5 degrees Celsius or less, or 0 degrees Celsius or less, or −5 degrees Celsius or less, or in a range from −40 to 5 degrees Celsius, or in a range from −30 to 5 degrees Celsius, or in a range from −20 to 5 degrees Celsius, or in a range from −15 to 5 degrees Celsius, or in a range from −10 to 5 degrees Celsius, or in a range from −5 to 5 degrees Celsius.

25. The display film according to claim 15, wherein the transparent cross-linked polyurethane layer has a Tan Delta peak value of 0.5 or greater, or 0.8 or greater, or 1.0 or greater, or 1.2 or greater, or in a range from 0.5 to 2.5, or in a range from 1 to 2.5, and the transparent cross-linked polyurethane layer has a cross-link density in a range from 0.1 to 1.0 mol/kg or from 0.2 to 0.9 mol/kg or from 0.37 to 0.74 mol/kg.

26. The display film according to claim 15, wherein the display film has a haze of 1.0 or less or 0.5 or less and a visible light transmission of 85% or greater, or 90% or greater.

27. The display film according to claim 15, wherein the transparent cross-linked polyurethane layer has a thickness in a range from 75 to 200 micrometers, or 100 to 200 micrometers, or from 150 to 200 micrometers.

28. The display film according to claim 21, wherein the transparent polymeric substrate layer, has a thickness in a range from 10 to 125 micrometers, or from 25 to 100 micrometers, or from 30 to 85 micrometers, and a yield stress value greater than 90 MPa, or greater than 100 MPa, or greater than 120 MPa, or greater than 160 MPa.

29. The display film according to claim 15, wherein the display film has a thickness in a range from 85 to 350 micrometers or from 100 to 300 micrometers or from 150 to 250 micrometers.

30. The display film according to claim 1, wherein the transparent cross-linked polyurethane layer comprises a plurality of layers, each layer formed of a cross-linked polyurethane material and at least two layers having a different glass transition temperature value.

31. The display film according to claim 1, wherein a premask layer defines an outer surface of the display film.

32. An article, comprising:
an optical display;
a display film according to claim 1; and
an optical adhesive layer fixing the display film to the optical display.

33. The display film according to claim 15, wherein the transparent cross-linked polyurethane layer comprises a plurality of layers, each layer formed of a cross-linked polyurethane material and at least two layers having a different glass transition temperature value.

34. The display film according to claim 15, wherein a premask layer defines an outer surface of the display film.

35. An article, comprising:
an optical display;
a display film according to claim 15; and
an optical adhesive layer fixing the display film to the optical display.

* * * * *